United States Patent [19]

Aterianus et al.

[11] 4,197,935
[45] Apr. 15, 1980

[54] AUTOMATIC FEEDING OF SPACED ARTICLES TO A PROCESSING MACHINE

[75] Inventors: John S. Aterianus; Donald C. Crawford, both of Green Bay, Wis.

[73] Assignee: FMC Corporation, San Jose, Calif.

[21] Appl. No.: 865,061

[22] Filed: Dec. 27, 1977

Related U.S. Application Data

[63] Continuation-in-part of Ser. No. 693,611, Jun. 7, 1976, abandoned.

[51] Int. Cl.² .................. B65G 43/08; B65G 47/31
[52] U.S. Cl. .................... 198/460; 198/461; 198/466; 198/697
[58] Field of Search ............... 198/817; 198/459, 460, 198/461, 466, 469, 572, 575, 576, 577, 606, 697, 817, 857

[56] References Cited

U.S. PATENT DOCUMENTS

| 1,476,936 | 12/1923 | Walden | 198/817 |
|---|---|---|---|
| 1,535,785 | 4/1925 | Luce | 198/817 |
| 2,646,869 | 7/1953 | Kay | 198/461 |
| 3,075,630 | 1/1963 | Fisk | 198/572 |
| 3,081,863 | 3/1963 | Monohan | 198/466 |
| 3,108,671 | 10/1963 | Fuka et al. | 193/35 A |
| 3,155,221 | 11/1964 | Griner | 198/425 |
| 3,208,321 | 9/1965 | Holt | 198/461 X |
| 3,217,859 | 11/1965 | Bartlo et al. | 198/460 X |
| 3,656,606 | 4/1972 | Comstock et al. | 198/460 |

FOREIGN PATENT DOCUMENTS

2346407  3/1974  Fed. Rep. of Germany ........... 198/460

Primary Examiner—James L. Rowland
Attorney, Agent, or Firm—L. J. Pizzanelli; J. F. Verhoeven

[57] ABSTRACT

Feeding a longitudinally extending lane of regularly spaced articles to a horizontal form, fill and seal wrapping machine is disclosed. To insure regularity of spacing and that no gaps are created, in-line operatively integrated storage and transferring conveyors and an infeed wrapper lug conveyor are provided. Articles in abutting relation on the storage and transferring conveyors are dispensed to the lug conveyor so that each successive article is engaged and fed by each successive lug of the infeed conveyor. In being transferred to the infeed lug conveyor longitudinal spacing of the articles is effected. Also according to the disclosed concept more than one article may be simultaneously transferred to the infeed lug conveyor.

14 Claims, 18 Drawing Figures

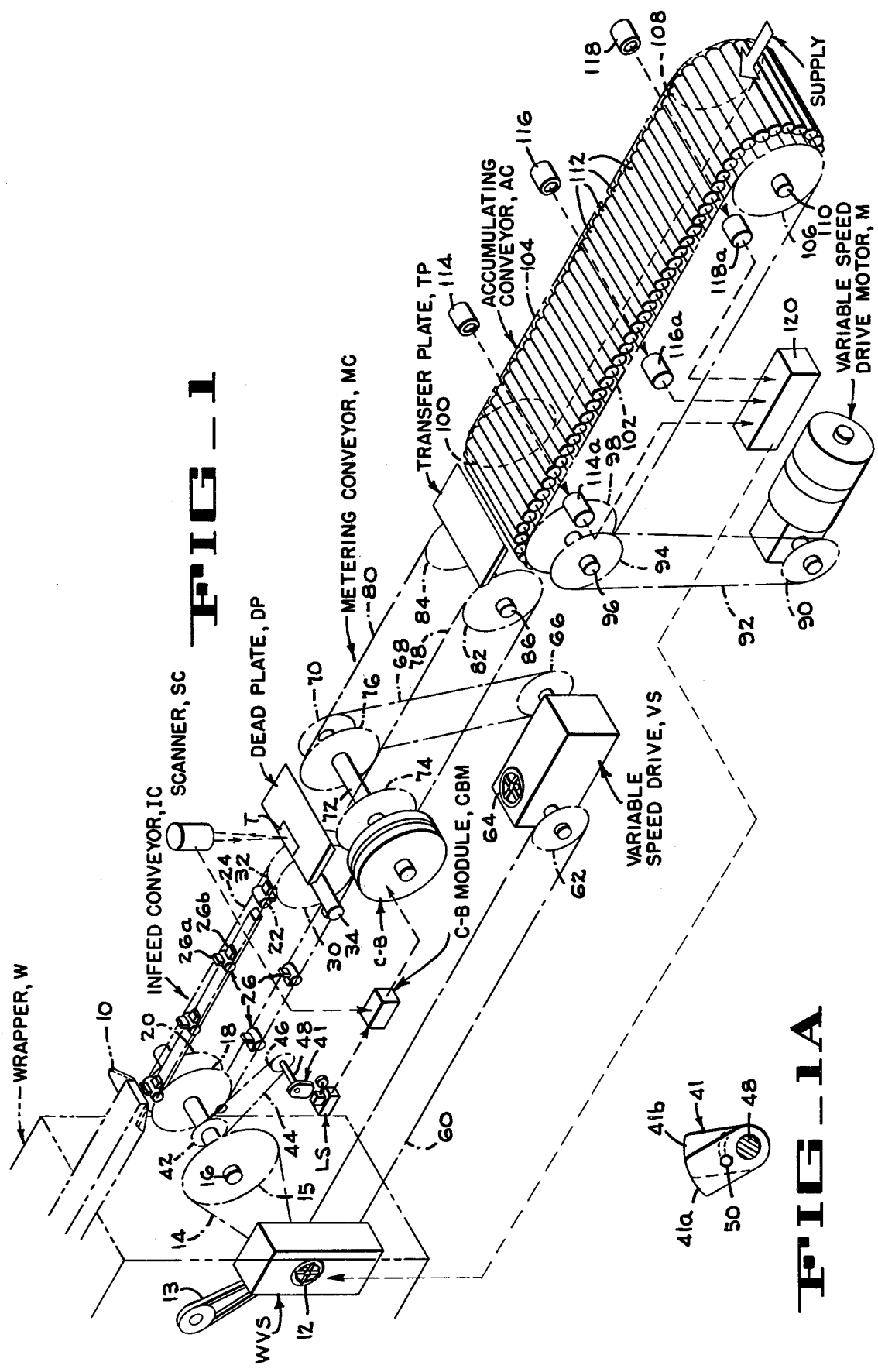

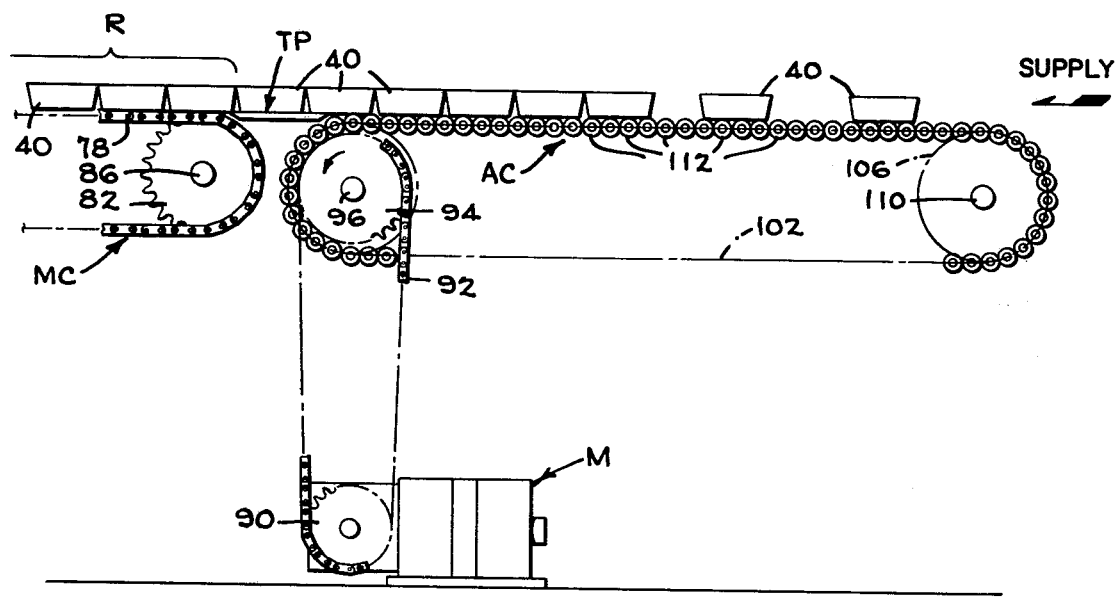
FIG_2
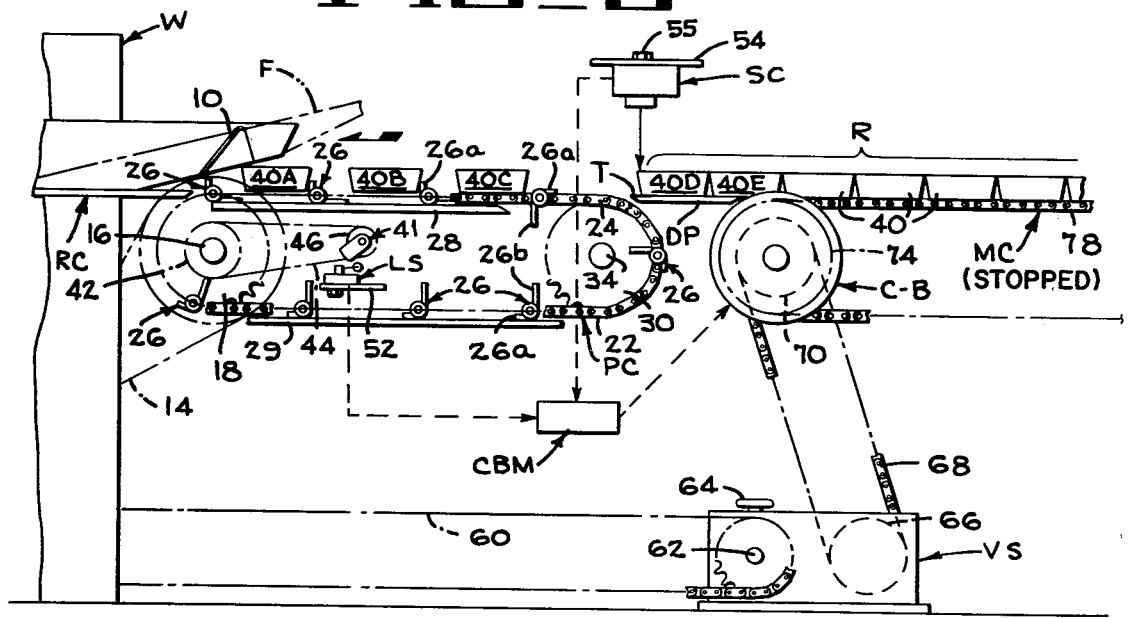
FIG_3

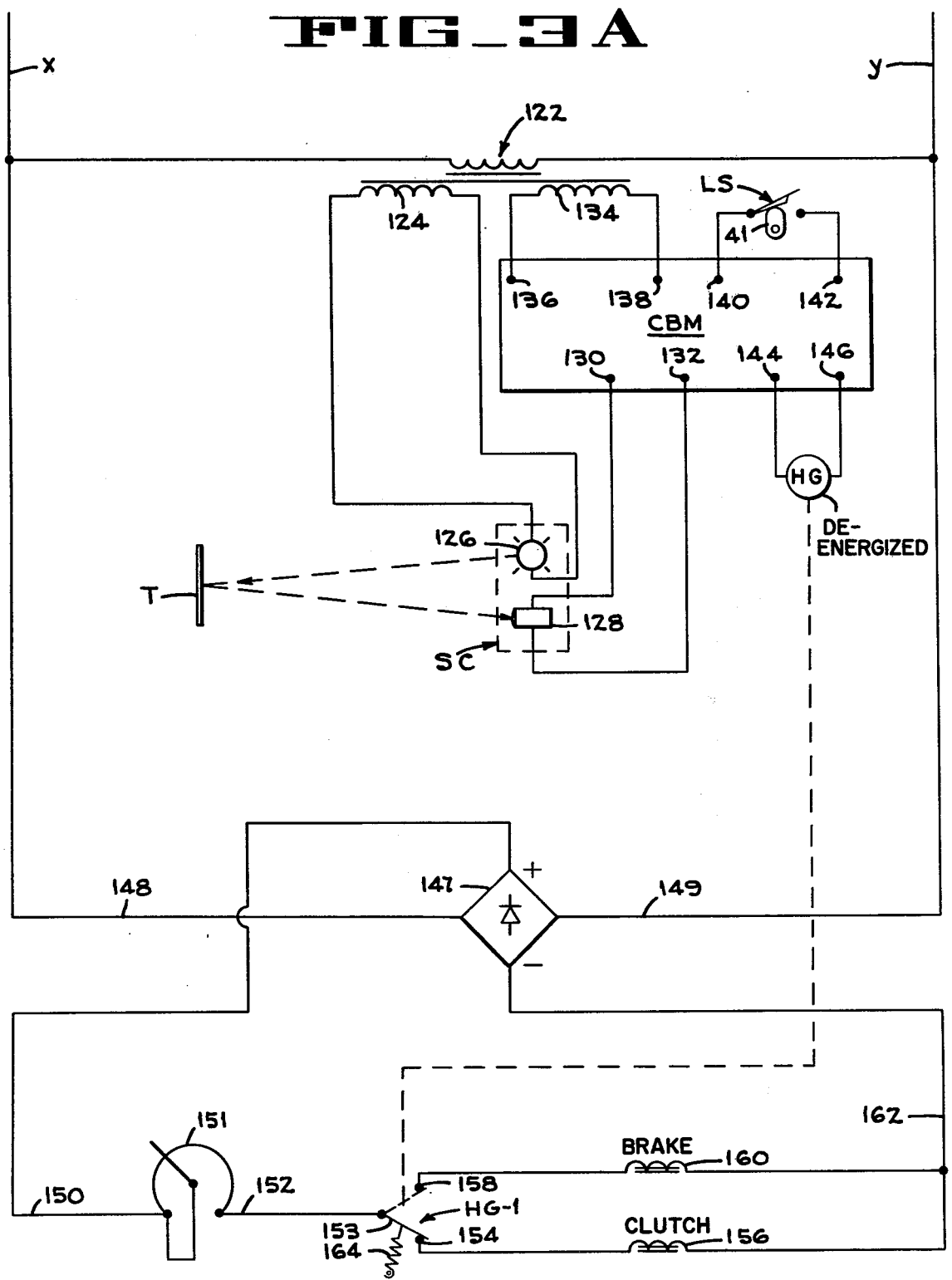

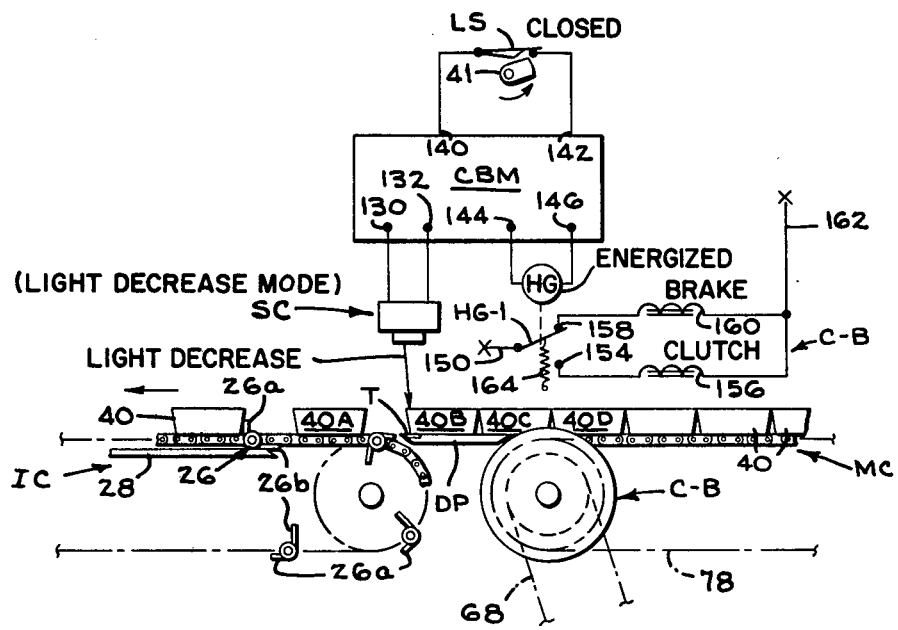
FIG_4
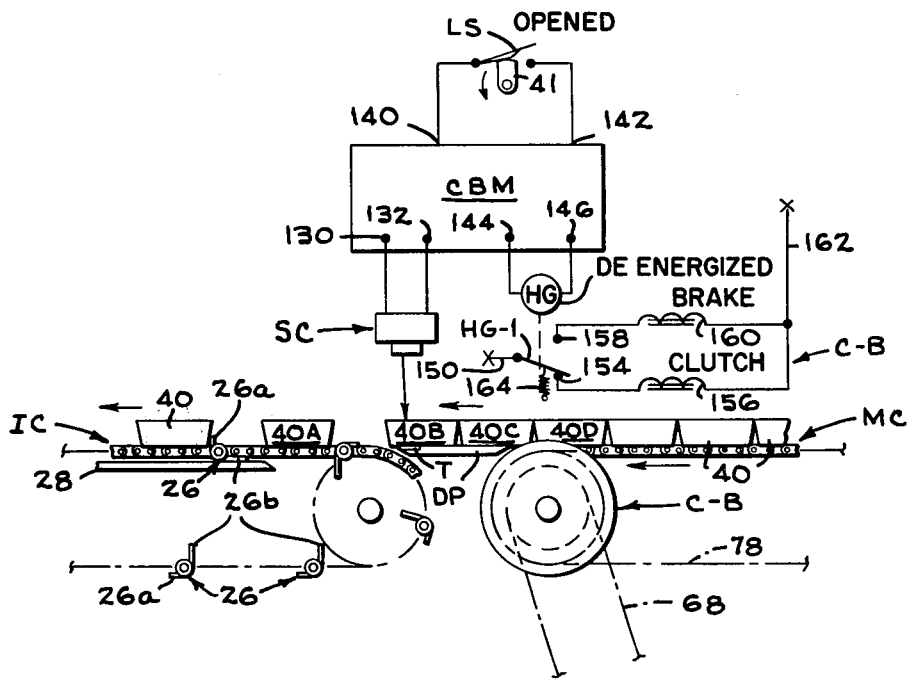
FIG_5

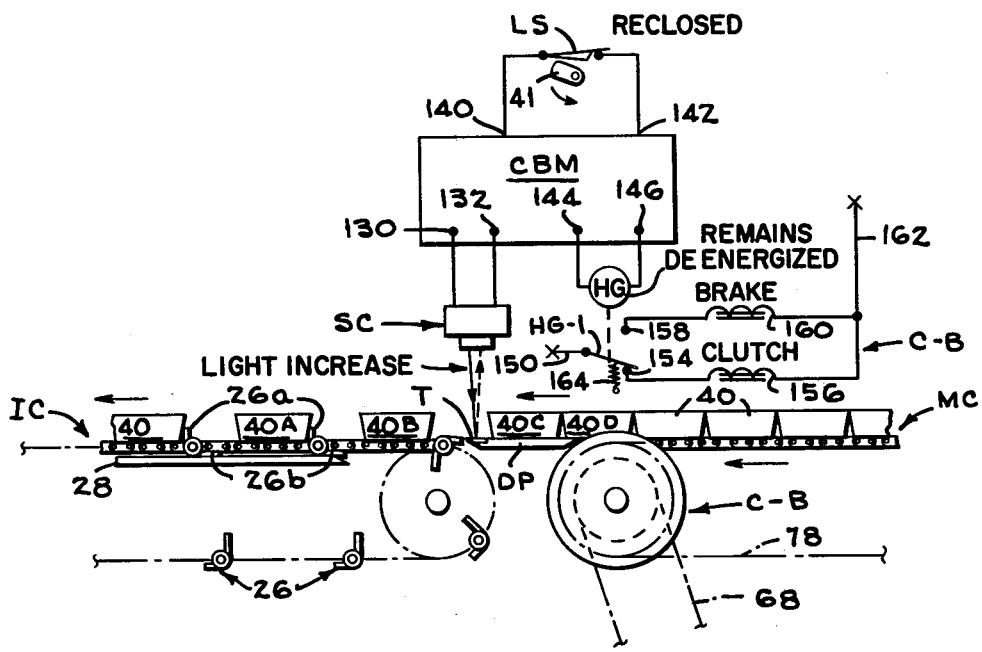
FIG_6
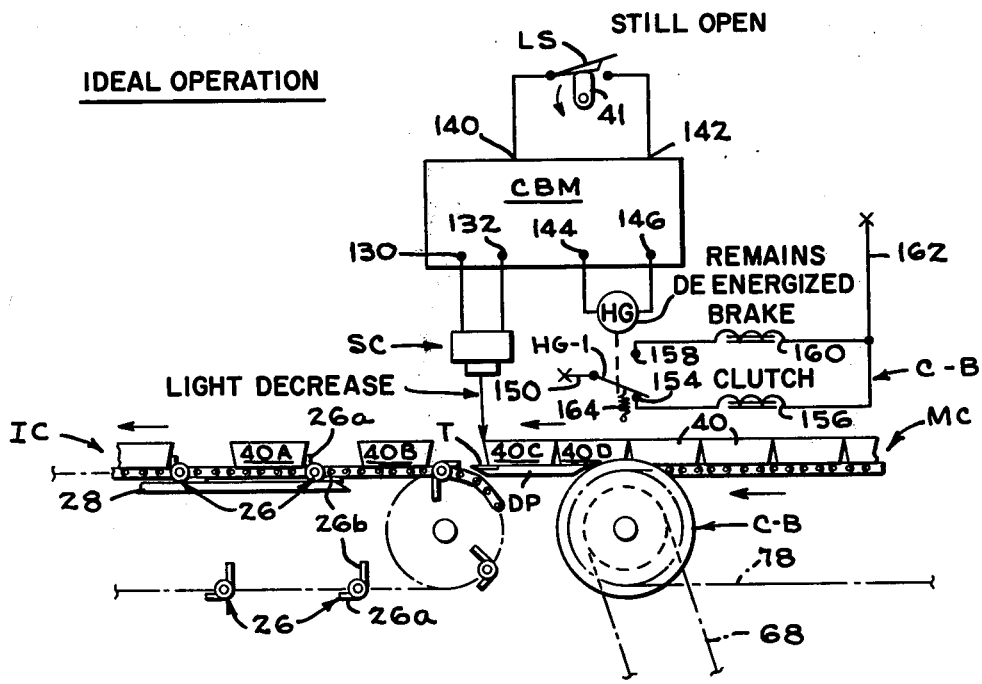
FIG_7

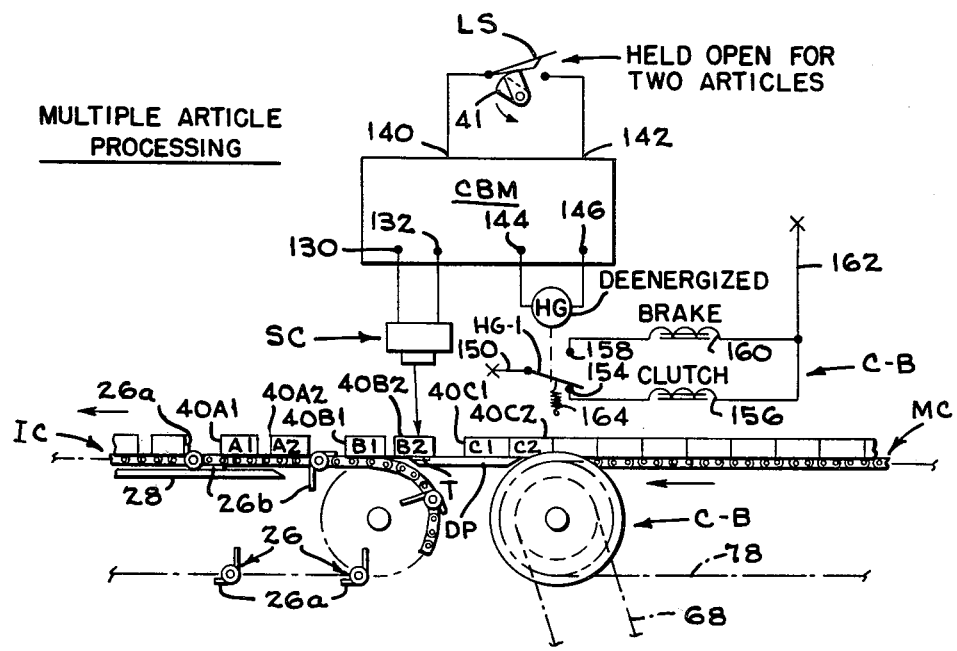
FIG_8
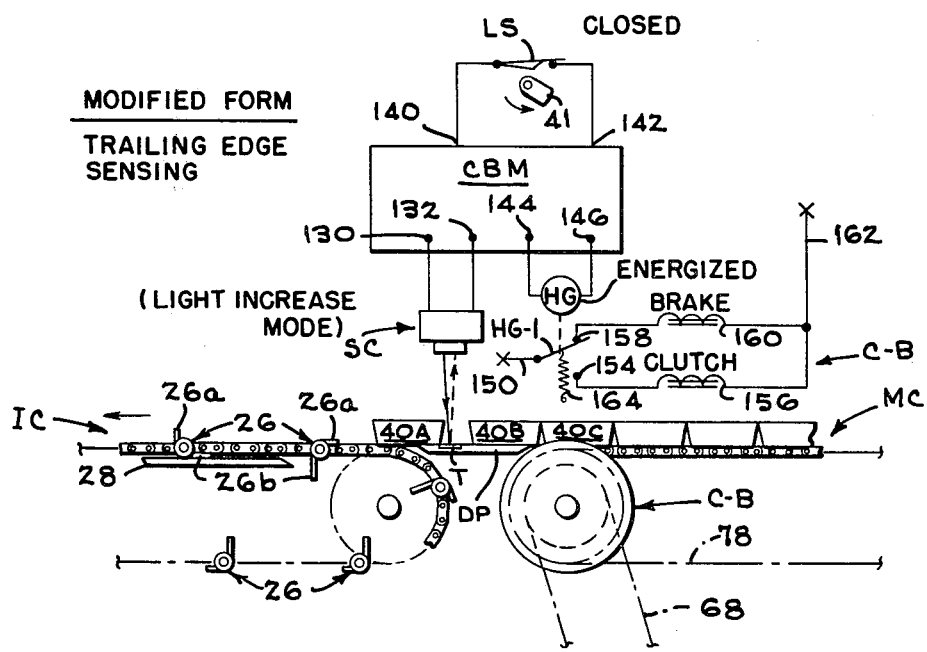
FIG_9

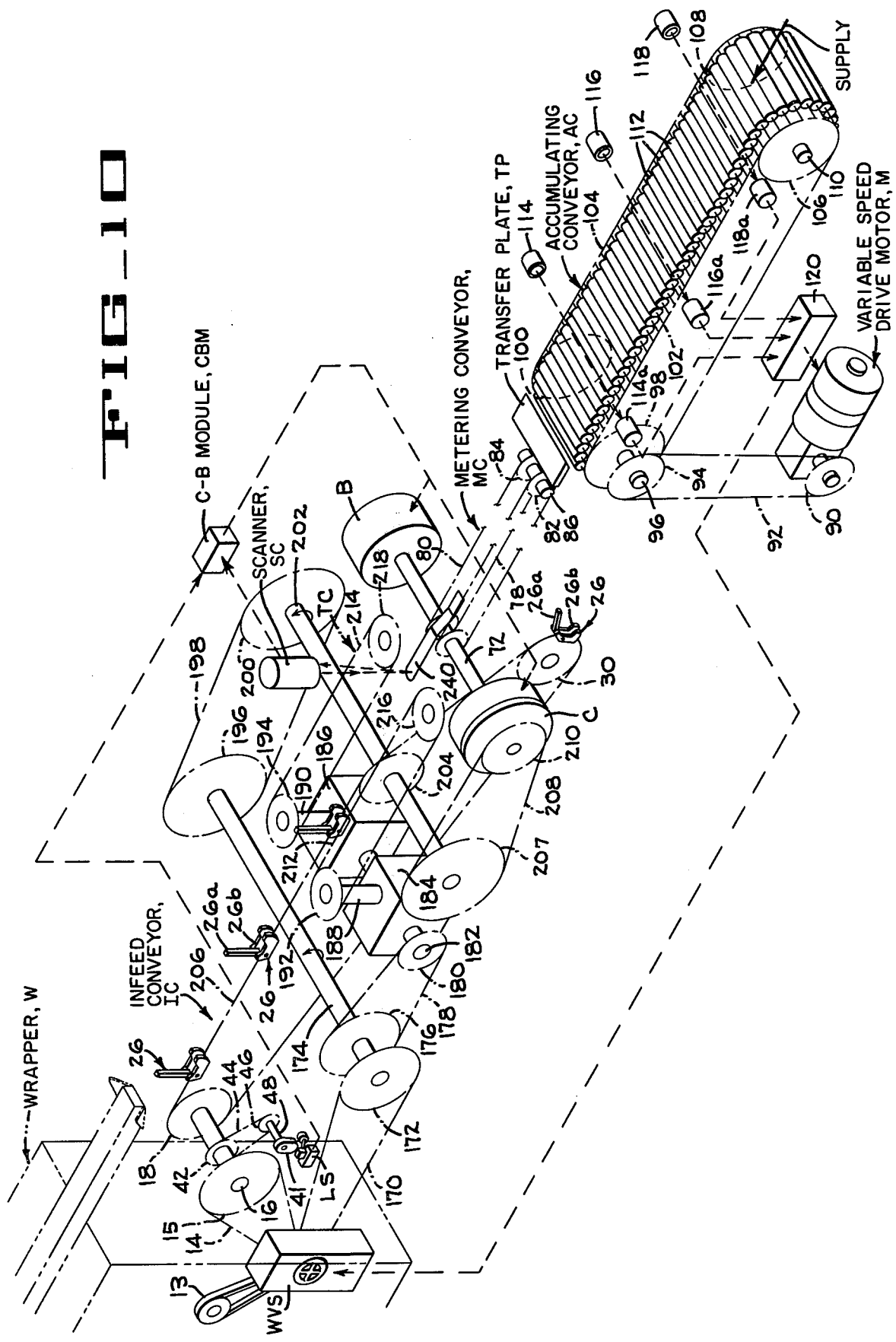
FIG_10

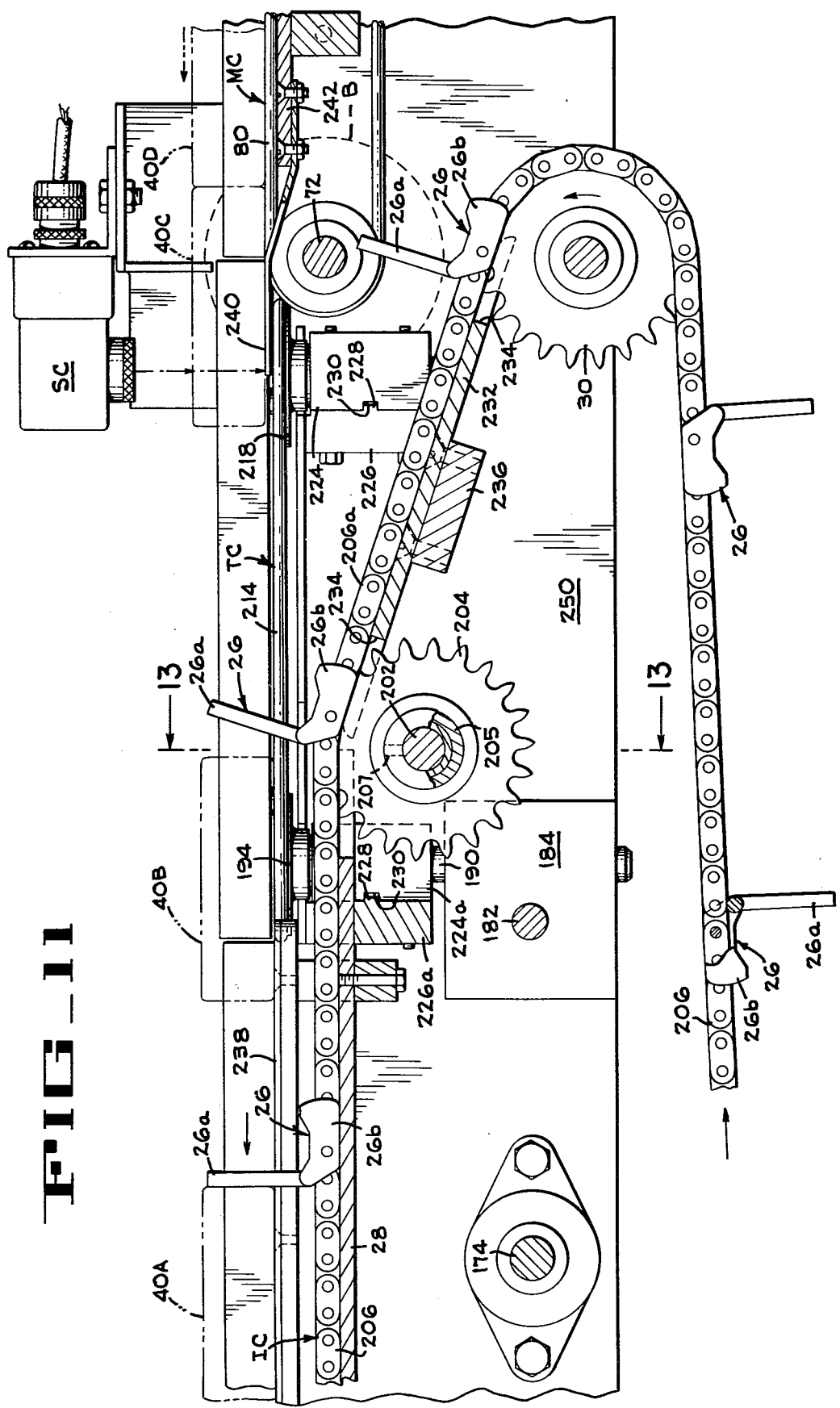

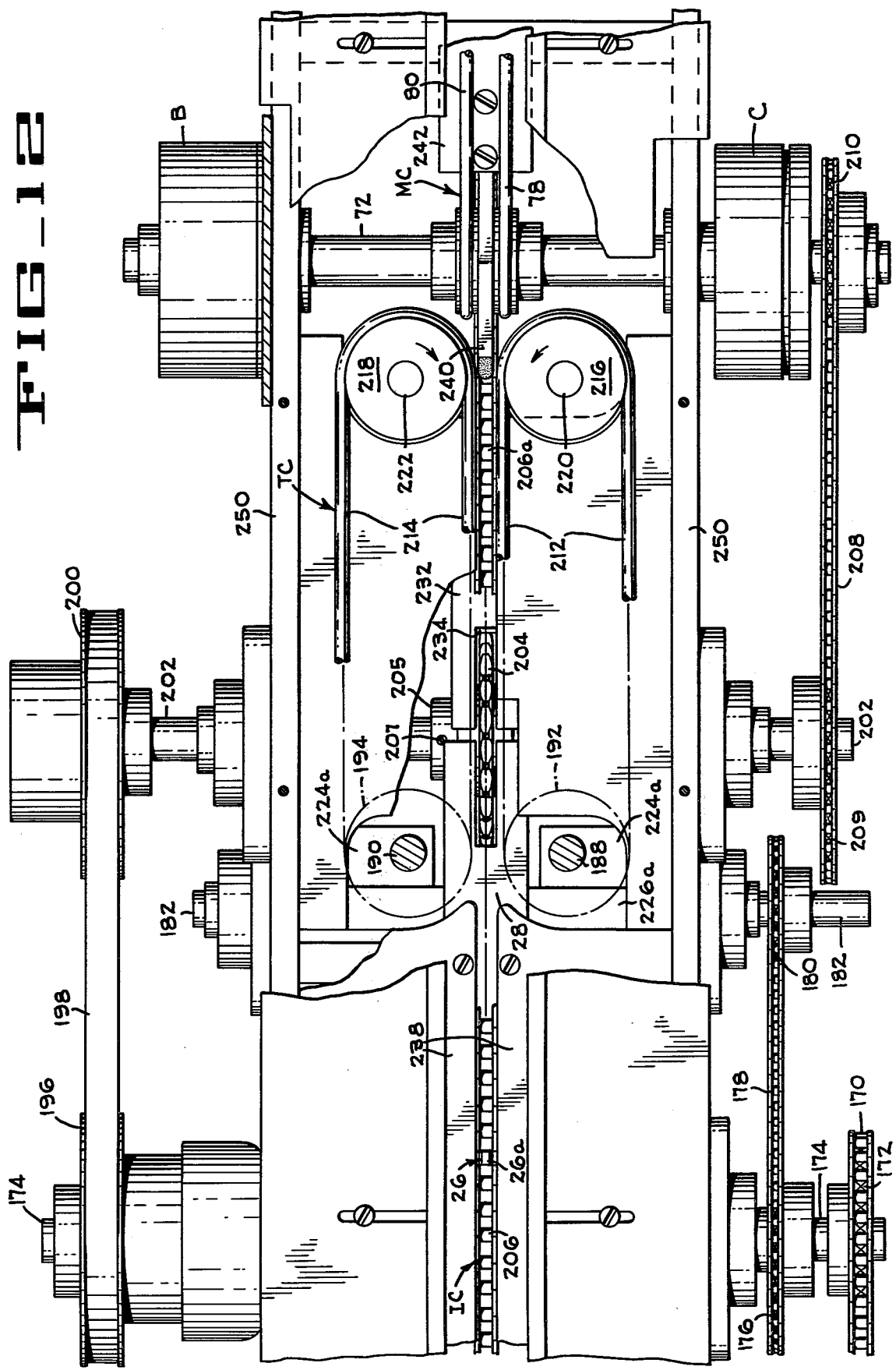

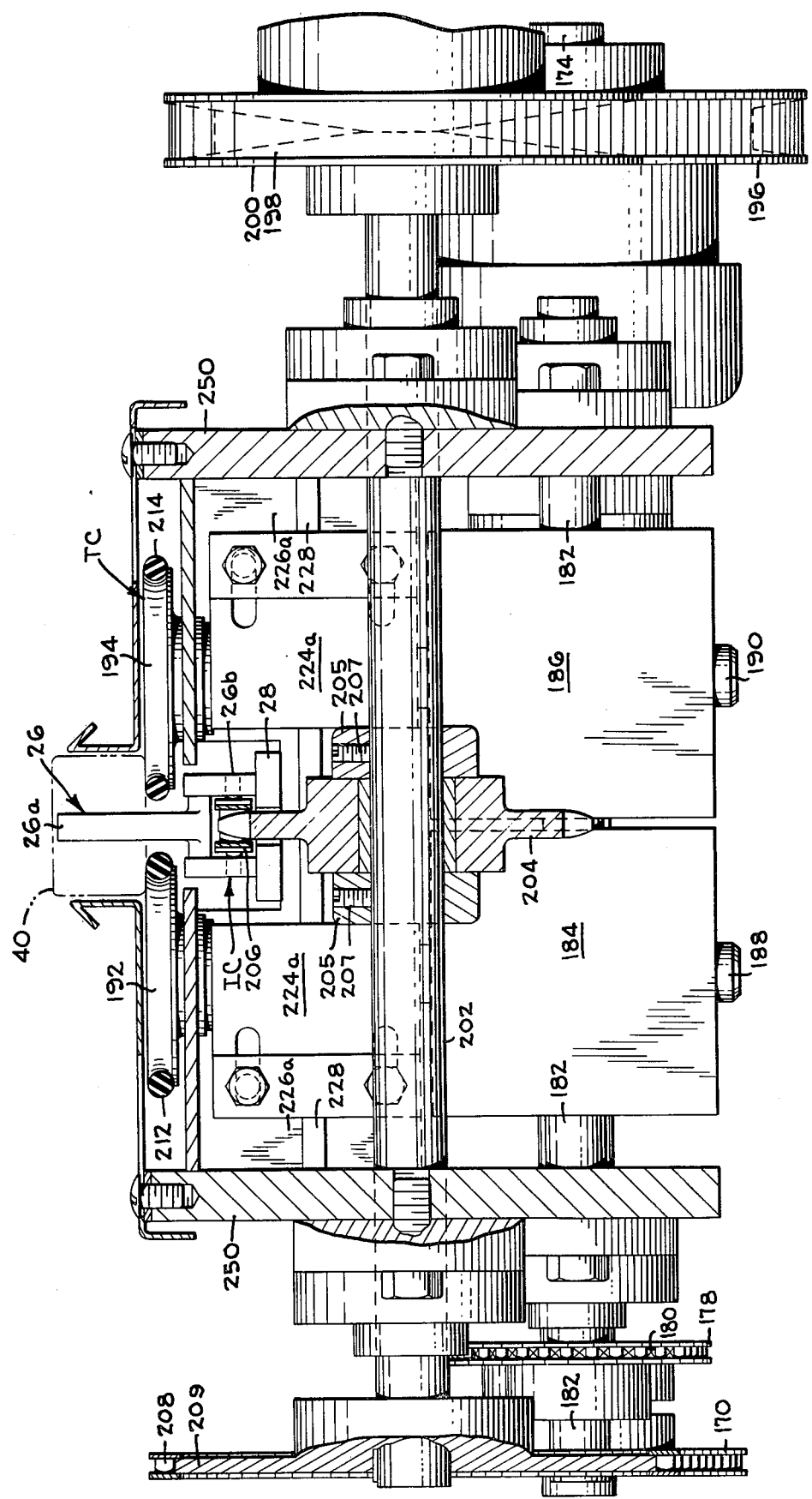

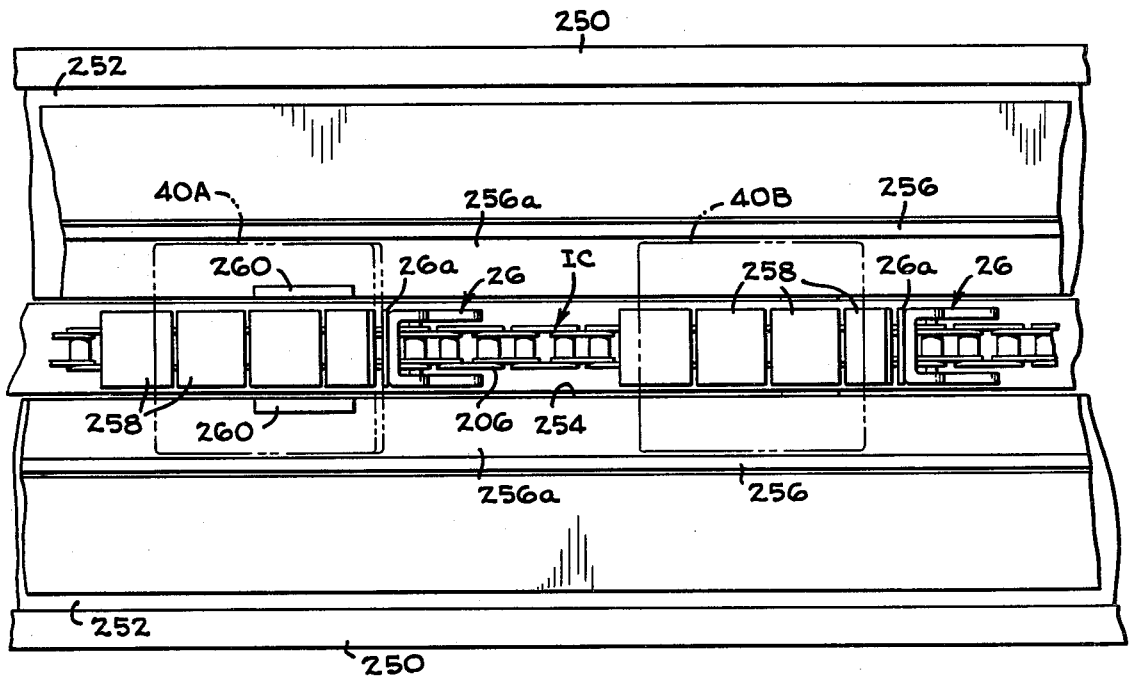
FIG_14
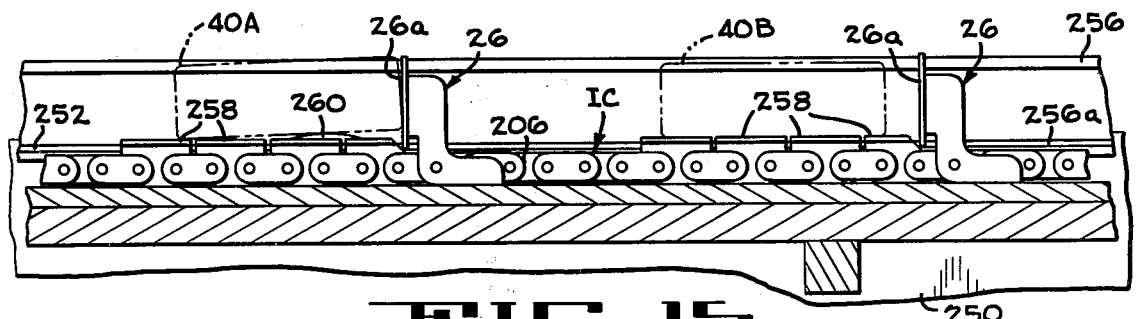
FIG_15
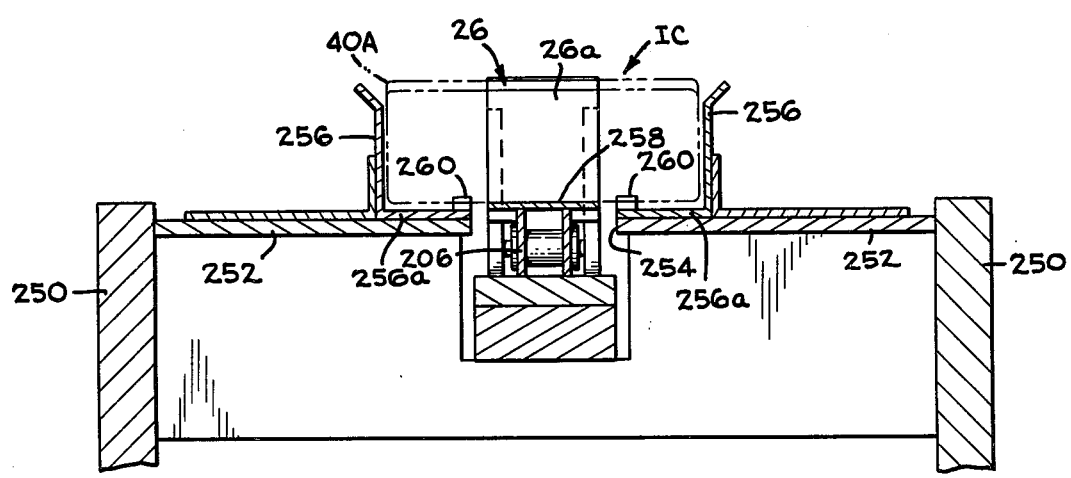
FIG_16

AUTOMATIC FEEDING OF SPACED ARTICLES TO A PROCESSING MACHINE

This application is a continuation in part of U.S. application Ser. No. 693,611 filed June 7, 1976 now abandoned.

FIELD OF THE INVENTION

This invention relates to article feeders and more particularly to automatic article feeders wherein single articles or groups of articles must be supplied in uniformly spaced relation to a processing machine, such as machine for wrapping the articles.

DESCRIPTION OF PRIOR ART

The feeder of the present invention is described as employed in conjunction with a wrapper of known type that wraps single articles or groups of articles in film or the like and cuts and seals the film to form individual packages containing the articles. Wrapping and other processing machines of this type require that the articles be fed to the machine in uniformly and precisely spaced condition so that (as in the case of a wrapping machine) after the articles have been wrapped in film or the like, there will be spaces between the articles for accommodating a sealing and cutting head assembly for forming the articles into individual package.

Prior wrapping machines of the type described employ a continuous drive mechanism for operating the feed rolls, seal bars, cut off devices, etc. They also employ an infeed conveyor driven from the aforesaid drive mechanism which infeed conveyor comprises a conveyor having a plurality of spaced lugs for advancing articles into the wrapping machine at a previously determined spacing so that the spaced articles can be formed into packages or otherwise processes, as described. Heretofore it has oftentimes been necessary to manually place the articles between the lugs of the infeed conveyor so that they are properly introduced into the wrapping machine. A typical infeed conveyor of the type just described is shown in FIG. 2 of the copending application of Aterianus Ser. No. 581,993, filed May 29, 1975, now U.S. Pat. No. 4,106,265, issued Aug. 15, 1978, and assigned to FMC Corporation and incorporated herein by reference. The positioning of individual articles to be processed between the spaced lugs of the moving infeed conveyor without damaging the articles while insuring that every space is filled is an inherently slow process and may require the utilization of a long infeed conveyor to provide access for several personnel charged with the task of feeding products between the lugs of that conveyor.

SUMMARY OF THE INVENTION

In accordance with the present invention, the aforesaid infeed conveyor is replaced with a feeding system which operates rapidly, automatically, and which insures that the articles will be properly positioned between every pair of lugs that feed the processing machine or wrapper without damage. The critical elements of the feeder of the present invention are driven from a continuous drive mechanism incorporated in the processing machine in order that full synchonization is maintained.

Briefly, the feeder has an infeed conveyor having longitudinally spaced, erectable article pushing lugs or dogs for positively feeding articles in spaced relation to the processing machine. As mentioned, the infeed conveyor and other elements of the feeder replace the conventional, fixed lug entrance conveyor. The feeder also includes a metering conveyor that advances articles to the infeed conveyor over a deadplate between those conveyors. The metering conveyor is driven by intermittent drive means (such as a clutch-brake unit) and like the infeed conveyor, the metering conveyor is driven from or in synchronism with the drive mechanism of the processing machine, but the metering conveyor is driven at a slower linear speed than that of the infeed conveyor so that when the infeed conveyor received an article from the deadplate, it accelerates that article relative to the trailing row of articles.

Upstream of the metering conveyor is an accumulating conveyor for feeding articles from an article supply to the metering conveyor at a rate that forms a row of articles in end-to-end abutment on the metering conveyor and on the deadplate.

The feeder includes a control system that insures that articles will be fed by the metering conveyor and picked up by the infeed conveyor without interference by dogs adjacent the deadplate, so that when entrance dogs are erected to their pushing positions they will not come up under newly picked up articles. The control system includes a switch that is cyclically operated in synchronism with the progress of the dogs on the infeed conveyor and the switch is operated every time the infeed conveyor moves a distance equal to the spacing between dogs. The switch is timed so that articles being picked up by the infeed conveyor from the deadplate are received without interference by a dog on that conveyor, as described. The control also includes a scanner which senses an edge of the leading article on the deadplate and cyclic operation of the switch, in response to position of the dogs on the infeed conveyor, causes the metering conveyor to advance leading articles in the row of abutting articles across the deadplate to be picked up and accelerated by the infeed conveyor. The scanner stops the advance of articles by the metering conveyor when the scanner senses an edge of the leading article of the advancing row of articles on the deadplate. The accumulating conveyor, which does not have dogs, is readily supplied with a supply of articles and is driven by a variable speed motor under photoelectric control so that a solid row of articles in end-to-end abutment is always provided to the metering conveyor and the deadplate.

An example of the speed with which the feeder of the present invention can supply a uniform and complete series of precisely spaced articles to a wrapping machine without damage will be mentioned. In a setup wherein the dogs on the infeed conveyor have about a six inch spacing and wherein the articles have a longitudinal dimension of about four inches, the feeder is capable of feeding such articles, under the conditions outlined, at a rate of about 200 articles per minute.

In preferred form of the invention, the scanner operates upon sensing the leading edge of an article on the deadplate but in a modified form it can be set to operate by sensing the trailing edge of the leading article as that article is picked up and accelerated by the infeed conveyor.

In the preferred form of the invention, the switch operated in accordance with the position of the dogs on the infeed conveyor, is controlled by a rotating cam driven in synchronism with the infeed conveyor and timed so that one revolution of the camshaft represents the travel of the infeed conveyor by a distance equal to the spacing between dogs. This cam is constructed to provide an adjustable dwell period and when the dwell period is extended, instead of placing ingle articles between the dogs of the pickup conveyor, the feeder can operate to place two or more articles between each pair of dogs.

Further in accordance with the concept of the present invention, a wide range of articles of varying dimensions can be reliably fed to the infeed conveyor with the only requirement being that the pitch of the dogs on the infeed conveyor is sufficient to accommodate articles of the length chosen. In addition to articles of various lengths the concept of the present invention is applicable to machines where articles of a variety of heights and articles which are highly irregular in configuration, for example articles whose corss-section, either longitudinally or transversely, vary in height, can be fed with a high degree of regularity to insure that each successive lug of the infeed conveyor has an article properly positioned for feeding.

Further in accordance with the present invention it is also possible to feed articles which require careful handling to prevent distortion and crushing of the articles. Articles such as shredded wheat, cream filled cakes, cracker sandwiches, frosted topped articles and choclate covered candy bars whose non-supporting surfaces should not be contacted in order to prevent cracking of the article can be properly handled.

Further and in accordance with the present invention the feeding system is in part controlled by a light sensitive detecting device which will respond to the passage of the leading or trailing edge of an article as it progresses from the storage or metering conveyor to the infeed conveyor. The detecting device is situated above the path of the articles so that gap formations (spacing between articles) are accurately indicated regardless of the height, contour or shape of the articles. More particularly the light sensitive detecting device responds to the amount of reflected light thereby permitting or facilitating adjustment to optimize gap sensing placement corresponding to the length of the product.

Further and in accordance with the present invention variable speed drives are provided for driving the conveyors in order to adjust the speed of the conveyors to optimize drive ratios for each product size in order to avoid, or reduce to an absolute minimum, the retarding or braking action to thereby operate the metering conveyor at constant speed which is the condition that should be fulfilled to increase product feed rates. By providing an adjustable drive speed ratios of the conveyors can be rapidly adjusted to accommodate the feed rates required by each article size.

In accordance with another feature of the present invention a control system is provided which insures intermittent or continuous operation of a conveyor so that at least a single file of articles are organized in abutting relationship and insures that each lug of the wrapper infeed conveyor is provided with an article in order to avoid empty web sections. The controls effecting this mode of operation are particularly advantageous when one desires to feed more than one article (multiples) to each lug of the wrapper infeed conveyor.

In accordance with a modified form of the present invention transfer of articles from a conveyor in which the articles are disposed in abutting relationship to the wrapped infeed lug conveyor is facilitated by providing opposed conveyors having the conveyor bands operating in a horizontal plane such that the conveying reaches are in opposed confronting relation. Such an organization of the conveyors is particularly effective when relatively high articles and articles which require careful handling are being processed. With respect to high articles it is now possible to position the lugs of the wrapper infeed conveyor closer since the lugs are projected between the opposing reaches of the horizontal conveyor along an incline path so that as the feeding lug is being erected viz., assuming a vertical orientation, the article is properly positioned.

The manner in which the above features and other features of the invention can be attained will be apparent from the following detailed description of a preferred and other embodiments of the invention.

DETAILED DESCRIPTION OF THE DRAWINGS

FIG. 1 is a diagrammatic perspective of a feeder embodying the present invention.

FIG. 1A is a schematic diagram of an adjustable cam that can be employed on the control system, FIG. 2 is a diagrammatic side view of the accumulator conveyor and the entrance portion of the metering conveyor, FIG. 3 is a diagrammatic side view of the exit portion of the metering conveyor, the infeed conveyor and a portion of a wrapping machine, FIG. 3A is a schematic wiring diagram of the control circuit, FIGS. 4-6 are diagrammatical operational views of the preferred embodiment, FIG. 7 is a diagrammatical operational view showing operation under ideal adjustment conditions, FIG. 8 is an operational diagrammatical operational view showing the feeder set for multiple article processing, FIG. 9, is a diagramatic operational view showing a modified form of the invention, FIG. 10 is a diagrammatic perspective of another modified form of the feeder incorporating a transfer conveyor, FIG. 11 is an enlarged fragmentary elevation, partly in section, of the discharge end of the metering conveyor, the inlet end of the infeed conveyor and the transfer conveyor, FIG. 12 is a plan partly in section of FIG. 11, FIG. 13 is a section taken substantially along the line 13—13 of FIG. 11, and FIGS. 14, 15 and 16 illustrate, by a plan, elevation and section, respectively, a modified form of the infeed conveyor including article supporting plates associated with each lug or dog of the infeed conveyors.

DETAILED DESCRIPTION

The feeder of the present invention will be described in connection with a processing machine which wraps individual or groups of articles in film or the like. Such machines are shown in the patent to Campbell U.S. Pat. No. 2,602,276 filed July 8, 1952 and in the aforesaid patented application of Aterianus Ser. No. 581,993, filed May 29, 1975 and assigned to the FMC Corporation. A common property of processing machines for which the feeder of the present invention is adapted is that they are intended to receive single articles or groups of abutting articles which articles or groups are uniformly spaced from one another in order that the processing machine, such as a wrapper, can perform its cyclic operations on the articles.

Referring to FIGS. 1–3, the feeder of the present invention is shown supplying articles to a wrapper W, at the receiving end a former 10 that receives wrapping film F (FIG. 3) and wherein the film is folded around the spaced articles to form individual packages that are subsequently sealed and separated. Such wrappers are known in the art and are also shown in the aforesaid Campbell patent and in the aforesaid Aterianus application, the latter showing details of the drive mechanism for such a machine.

Major Elements of the Feeder

The major elements of the feeder of the system of the present invention appear in FIG. 1, These elements include an infeed conveyor, IC which feeds articles into the former 10 and the path of articles along the former is a longitudinal continuation of or is aligned with the path of travel of articles supplied by the infeed conveyor IC. The infeed conveyor carriers retractable dogs or lugs to positively feed articles to the wrapper in uniformly spaced relation. The infeed conveyor IC is fed by an intermittently driven metering conveyor MC, which advances a row of articles in end-to-end abutment (see FIG. 3) across a transfer or deadplate DP, from which leading articles are picked up by the infeed conveyor IC, the latter having a higher linear speed than that of the metering conveyor MC. An accumulating conveyor AC receives a supply of articles and advances them across a transfer plate, TP to the metering conveyor MC. The speed of the accumulating conveyor AC is adjusted as required so that it brings the articles into abutting relation, as shown in FIG. 2, so that a solid row of abutting articles is transferred to the metering conveyor MC.

The infeed conveyor IC is driven from a variable speed drive WVS of the Wrapper W. The metering conveyor MC is also driven by a variable speed drive VS from the variable speed drive WVS of the wrapper, so that both conveyors are synchronized with the wrapper. The metering conveyor MC is intermittently driven through a clutch-brake assembly C-B. Clutch brakes of the type employed in the present invention are known in the art and a suitable design is the Clutch-Brake Coupling, Model TCBC-500 manufactured by the Warner Electric Brake and Clutch Company of Beloit, Wis. The wrapper W is driven by the variable speed drive motor WVS under control of a photoelectric system which varies the speed of the wrapper to insure that a solid row of articles will be transferred to the metering conveyor. as explained with regard to FIG. 2.

A feature of the present invention relates to control of the clutch-brake C-B for the metering conveyor MC, which insures that individual articles or groups of articles will be delivered to the infeed conveyor IC without interference by dogs on that conveyor which are in the zone of the deadplate DP. This control includes a limit switch LS which is operated in synchronism with the infeed conveyor IC and a scanner SC. In the form shown, the scanner SC is of the retro-reflective type. When no articles interrupt the scanner, light from the scanner is reflected back into the photo-electric element of the scanner by a reflective tape T which may be on or adjacent the deadplate DP. In the preferred form of the invention, the scanner SC is a model MCS-615 Reflective Scanner, manufactured by the Warner Electric Brake and Clutch Company or Beloit, Wis. The limit switch LS and the scanner SC are connected into a control circuit which includes a clutch-brake module CBM that alternately energizes the clutch and releases the brake or energizes the brake and releases the clutch of the clutch-brake C-B. Details of the circuit elements of the module CBM are not critical to the present invention. A module suitable for use in the feeder is commercially available as the Model TR4-3 logic Module, manufactured by the Micro Switch Farmer Electric Division of the Minneapolis-Honeywell Corporation of Freeport, Ill. These modules can be set to operate on either of two modes, namely they can be set to operate when the light reflected to the scanner SC decreases or when the light reflected to the scanner SC increases. In the embodiment of the invention to be first described, the module CBM is set to operate in the light decrease mode.

Infeed Conveyor

In order to drive the infeed and metering conveyors the wrapper W includes a variable speed drive WVS of a construction known in the art and which has a speed control handle 12. The variable speed drive WVS drives a mechanism 13, shown diagrammatically, for operating units within a wrapper. It also drives a chain and sprocket assembly 14, 15 which drives a shaft 16 that drives the head sprockets 18, 20 from side chains 22, 24 of the infeed conveyor IC. The shaft 16 is rotatably mounted in the frame, the latter not being shown for clarity of illustration. The infeed conveyor side chains 22, 24 mount pivoted dogs 26 and the entry end of the conveyor is formed with idler sprockets 30, 32 about which the chains 22,24 are trained. These sprockets are mounted on an idler shaft 34 also mounted in the frame.

The construction of a retractable dog conveyor is known in the art and except for the timing of erecting of the dogs the specific details of that construction are not critical to the present invention. The construction is illustrated in simplified form and is best seen in FIG. 3. The dogs 26 are L-shaped and are pivotally mounted between the side chains 22,24. Each dog has a longitudinally thin pushing leg 26a and a weighted leg 26b. As seen when the dogs first travel along the upper reach of the infeed conveyor IC, the weighted or heavier leg 26b causes the pusher leg 26a to lie below or flush with the side chains 22,23. As the dogs are advanced along the upper reach of the infeed conveyor, the weighted leg 26b slides along a track 28 which erects the dogs so that the pusher legs 26a comes up behind articles, such as articles 40a and 40b in FIG. 3. Before the dogs 26 reach the track 28, the pusher legs 26a are flush with or below the side chains 22,24 so that articles 40 can be slid over them, such an article 40c in FIG. 3. The positions of the dogs on the infeed conveyor IC on the return reach of the conveyor and around the sprockets is not critical to the present invention. As seen in FIG. 3, a track 29 is provided for supporting the pusher legs 26a of the dogs while the weighted legs 26b project upwardly. In accordance with the present invention, operation of the limit switch LS is synchronized with the infeed conveyor IC so that the limit switch is operated every time infeed conveyor advance is equal to the space between the dogs 26. The operation is, in turn, timed so that the limit switch LS will not be operated until the dogs are in position to let the infeed conveyor receive articles from the deadplate DP without interference by the dogs and with dogs in their correct position to insure that an article will be positioned between dogs and that erection of a dog by the track 28 will not cause its pusher leg 26a to come up under an article.

Functionally, the limit switch LS could be operated by one of the dogs which would insure that the switch is properly timed and that it is operated each time the infeed conveyor IC advances a distance equal to that of the spacing between the dogs. However, in the preferred embodiment, and as see in the FIGS. 1 and 3, the limit switch LS is operated by a cam 41 which is synchronized with the drive of the infeed conveyor. The cam is operated by a sprocket 42 on the head shaft 16, a chain 44, a driven sprocket 46 and a camshaft 48 which is supported as an independent jackshaft on the frame of the machine (not shown). In the preferred embodiment of the invention and as seen in FIG. 1A, the cam 41 is an adjustable cam having lobes 41a and 41b, which can be closed or spread to increase the dwell period of limit switch operation. These lobes can be connected by an arcuate slot and clamp bolt assembly 50 to vary the dwell of the cam. The dwell period can be increased to present groups of two or more articles 40 to the infeed conveyor IC instead of a single article.

In order to facilitate timing of the control circuit, the limit switch LS is adjustably mounted on a plate 52 (FIG. 3) by a slot and a clamp mounting (not shown) so that the switch can be clamped at any position along the mounting plate to fine tune the timing of limit switch operation. Similarly the scanner SC, (FIG. 3) can be adjustably positioned on a support plate 54 by a clamp 55 and a slot in plate 54 (not shown) to determine the precise position at which an edge of an article on the deadplate DP is sensed by the scanner.

Metering Conveyor

As mentioned, the metering conveyor MC is driven by a variable speed drive VS from the wrapping machine drive WVS. This provides for adjustment of metering conveyor speed in accordance with the spacing of the dogs 26 on the infeed conveyor IC. The variable speed drive VS is driven by a chain 60 from the drive WVS of the wrapper and an input sprocket 62. A speed control wheel 64 is provided. The drive VS has an output sprocket 66, which drives chains 68 and a drive sprocket 70 (FIG. 1) for the head shaft 72 of the metering conveyor MC under control of the clutch-brake C-B. In the form shown, the metering conveyor comprises endless chains 78,80 trained around drive sprockets 74,76 on the shaft 72 and around idler sprockets 82,84 on an idler shaft 86. Both shafts are rotatably mounted in the frame (not shown) in a conventional manner. Details of the means whereby the metering conveyor MC supports a row R of articles 40 (FIGS. 2 and 3) are not critical to the present invention. The conveyor may comprise simply a pair of synchronized chains or the chains may be connected by flight bars, or they may be replaced by a positively driven flat belt having a cog belt drive of known design. The function of the metering conveyor MC is that of advancing an abutting row R of articles 40 intermittently, under control of the scanner SC, the limit switch LS and the clutch brake module CBM.

Accumulating Conveyor

The function of the accumulating conveyor AC is to receive a random supply of articles and to advance those articles at a rate so that they come into an end-to-end abutting relation and are thus fed across the transfer plate TP to the metering conveyor MC, as seen in FIG. 2. As mentioned, the accumulating conveyor is driven by variable speed motor M. This motor has an output sprocket 90 (FIG. 1) which drives a chain 92 and a sprocket 94 on the head shaft 96 of the accumulating conveyor. The head shaft mounts spaced drive sprockets 98,100 over which are trained endless chains 102,104. These chains are trained around idler sprockets 106, 108 on an idler shaft 110, and both the shafts 96 and 110 are rotatably mounted in the frame (not shown).

In the illustrated form of the accumulator conveyor AC the articles are supported on rollers 112, the ends of which are supported by the side chains 102,104. The speed of the wrapping machine W is adjusted by the loading and spacing of articles 40 along the conveyor, to maintain a solid row of articles at the delivery end, as previously mentioned. Backlog length controls of this type are known in the art and such a control is illustrated diagramatically in FIG. 1. Paired electric lights and photoelectric cells 114, 114a; 116a and 118, 118a sense the spacing and loading of articles along the conveyor and are connected to a logic module 120 which correspondingly adjusts the speed of the variable speed drive motor WVS so that the aforesaid article abutment delivery conditions are maintained. As mentioned, the details of the accumulating conveyor AC are not critical to the present invention, so long as it serves the purposes described.

Electrical Circuit

FIG. 3A shows a schematic diagram of the electrical circuit of the control system. The clutch-brake module CBM is shown as a block diagram, because the details of the internal circuitry of the logic module are not critical to the invention. Under the present state of the control art, once certain desired operating characteristics are determined by a design engineer, suitable modules for performing the desired logic or sequence functions are readily assembled or are attainable as off-the-shelf items, such as the Micro Switch-Farmer Electric module TR4-3, previously mentioned and utilized in the disclosed embodiment of the invention.

The control system is powered by AC power lines x,y. The primary winding 122 of a transformer is connected across the power lines and one secondary winding 124 supplies power for the lamp 126 of the retro-reflective scanner SC. The photoelectric sensor element 128 of the scanner is connected to the module CBM at terminals 130, 132. In FIG. 3A the reflective tape T is also illustrated, the light from the lamp 126 being reflected by the tape back to the photosensitive element 128 unless an article intercepts the beam.

The clutch-brake control model CBM receives power from the secondary winding 134 of the transformer connected to power terminals 136, 138 of the module. The module has latch control or input terminals 140,142 to which the limit switch LS (opened by the cam 41) is connected. The module has output terminals 144,146 to which a relay, such as a mercury switch relay HG is connected. Internal operation of the module CBM is such that the relay HG can be latched into its "on" or energized condition when the contacts LS are closed and when the contacts LS are open by the cam 41, as illustrated in FIG. 3A, the module is reset or unlatched and the mercury relay HG is de-energized.

In order to supply power to the clutch-brake unit C-B, a rectifier 147 is connected across the AC power lines x,y by lines 148, 149. The rectifier provides direct current for operation of the clutch-brake unit. The positive line 150 of the rectifier is connected to a voltage adjusting rheostat 151 which is connected by a line 152 to the movable contact arm 153 of the switch contacts HG-1 operated by the relay HG. This is a single pole, double throw switch. One fixed contact 154 of the switch energizes the electromagnet 156, which engages the clutch. The other contact 158 of the switch energizes the electromagnet 160 that sets the brake. The clutch-brake electromagnets are connected to the negative DC line 162.

In order to illustrate diagramatically that the clutch-brake unit is on clutch when the relay HG is de-energized, a spring 164 is shown connected to the moveable arm of the contacts HG-1. The spring may not be actually present in the mercury switch HG embodying the contacts HG-1, but it is added for convenience in understanding the mode of operation. Thus, in the condition shown in FIG. 3A, when the module CBM energizes the relay HG, the switch contacts HG-1 open the clutch contact 154 and close the brake contact 158, to release the clutch and set the brake. When the relay HG is de-energized the arm 153 closes the contact 154, which releases the brake and engages the clutch.

Operation

Having described the essential details of a feeder system representing the preferred embodiment of the invention, the operation thereof will be described briefly in connection with the schematic diagrams of FIGS. 4–6.

In the operational diagrams of FIGS. 4–6, the module CBM is set to operate on the "light decrease mode". This means that for the scanner to trigger an output at the terminals 144,146 of the module CBM, the scanner light beam must first be reflected from the tape T and then an edge of one of the articles 40 must intercept the light beam from the scanner. This interception of the reflected beam causes a decrease in intensity of the reflected light to the scanner SC and if the LS contact is closed this results in module CBM providing an output pulse to the terminals 144,146. With the above explanation, a brief summary of the critical operating conditions follows:

FIG. 4

1. Reflection of light to the scanner from the reflective tape T is interrupted by the leading edge of an article 40B being advanced across the deadplate DP, which provides a light decrease signal pulse from the scanner. The previously leading article 40A has been picked up and accelerated by the infeed conveyor IC which has established a gap between the article 40A and the leading article 40B of the row.

2. The contacts of the limit switch LS are closed, but they are about to be opened by the cam 41. Closing of the switch internally latches the internal circuit to the output terminals 144,146 connected to the relay HG so they can respond to the light decrease pulse signal from the scanner SC.

3. With the switch LS closed and upon receipt of the light decrease pulse signal from the scanner the relay HG is energized and the contacts HG-1 are switched to the position shown in FIG. 4 for energizing the electromagnet 158 of the brake and releasing the clutch.

4. Under the above conditions, the metering conveyor MC stops.

5. As mentioned, the infeed conveyor IC continues to accelerate the previously leading article 40A away from the leading article 40B in the row R of articles terminating on the deadplate DP.

6. The rotating cam 41 is about to open the limit switch LS.

FIG. 5

1. The article 40A on the infeed conveyor IC is now properly in position between adjacent dogs 26 and the dogs on the infeed conveyor are ready to receive the leading article 40B of the row of articles on the deadplate DP and the metering conveyor.

2. The limit switch LS is opened by the cam 41.

3. The output terminals 144,146 of the clutch-brake moduel CBM are unlatched and the relay HG is de-energized.

4. The scanner SC has no effect on the relay HG. Light is still being reflected from the leading article 40B and the scanner only provides a pulse signal when its beam is interrupted after reflection from the tape. In fact, when the contacts LS are opened by the cam 41, the internal circuitry of module CBM is such that even if the scanner produced an output pulse signal, it would not energize the relay HG, and hence would not place the metering conveyor on brake.

5. With the relay HG de-energized, the contacts HG-1 shift from the brake magnet 160 to the clutch magnet 156, releasing the brake and energizing the clutch of the C-B unit.

6. With the clutch engaged, drive to the metering conveyor MC is initiated and it starts advancing a row R of abuting articles across the deadplate towards the infeed conveyor IC.

FIG. 6

1. The cam 41 has turned far enough to re-close the switch contacts LS.

2. This rearms the module CBM so that its output terminals 144,146 to the relay HG are conditioned to respond to a light decrease pulse signal from the scanner SC.

3. The previously leading article 40B has now been picked up by the infeed conveyor IC and is being accelerated to provide a gap between the article 40B and the trailing article 40C, which is now the leading article in the row.

4. Because of the development of the aforesaid gap between articles, the scanner SC receives reflected light from the reflecting tape T, but this light increase does not provide a pulse signal from the scanner, because the scanner is operating in its light decrease mode.

5. The relay HG remains de-energized and its contact HG-1 keeps the metering conveyor MC on clutch.

6. The row of articles on the deadplate DP and the metering conveyor MC continues to be advanced as before, it being recalled that the speed of operation of the metering conveyor is slower than that of the infeed conveyor IC.

Return to FIG. 4 Conditions

After the condition just described in conjunction with FIG. 6, the metering conveyor MC continues to advance the row of articles on the deadplate DP and on the metering conveyor until the leading article 40C intercepts the light beam from the scanner SC just as did the article 40B under the conditions of FIG. 4. This provides another light decrease pulse signal from the scanner to the module CBM. With the limit switch LS still closed, the module CBM energizes the terminals 114,146 placing the metering conveyor MC on brake. The infeed conveyor IC which had previously received the article 40B from the deadplate DP (as shown in FIG. 6) continues to increase the gap between the article 40B and the leading article 40C of the row. The metering conveyor MC remains on brake until the infeed conveyor IC is in the proper position to receive the next article, namely, the article 40C. When this condition of the infeed conveyor IC is attained, the cam 41 opens the contacts LS (as in FIG. 5) and the metering conveyor MC goes back on clutch as described in connection with that figure.

Ideal Operation

FIG. 7 illustrates what will be termed "ideal operation" wherein the clutch-brake unit C-B remains on clutch continuously. Under some circumstances the ideal operating condition can be attained by carefully timing the operation of the limit switch LS and by properly adjusting the position of the scanner SC. Then, if the length of successive articles remains uniform and if they are maintained in abutting relation it is theoretically possible that the metering conveyor MC will remain on the clutch. This condition may, in practice, be obtained for at least a number of articles and if the condition is lost for one reason or another, the automatic clutch-brake operation previously described in connection with FIGS. 4-6 will come into play and the machine will continue to properly feed articles to the processing machine.

The requirements for ideal operation are as follows:

1. The article 40B, for example, picked up by the infeed conveyor IC is in a position so that the infeed conveyor is ready to receive the next leading article 40C on the deadplate and the limit switch LS is opened.

2. The speed of the metering conveyor MC relative to that of the infeed conveyor IC is such that while the limit switch LS is still open, the leading edge of the article 40C has interrupted the light beam from the scanner SC. Under these conditions, there has been no light increase situation, such as shown in FIG. 6, followed by a light decrease signal, such as that shown in FIG. 4, while the limit switch LS is closed. In the ideal operating conditions of FIG. 7 the scanner pulse was received while the switch LS is still open and hence there is no output from the module terminals 130,132 as previously explained.

3. Under the above conditions, the relay HG remains de-energized and the metering conveyor does not go on brake (as in FIG. 4) but remains on clutch. Thus, the metering conveyor can run continuously and transfer articles to the infeed conveyor in their proper positions without switching the clutch-brake unit C-B. Although the ideal operation conditions may not prevail continuously when they do prevail, they correspondingly reduce the wear on the clutch-brake unit and enable higher rates of operation.

Multiple Article Processing

FIG. 8 shows an adjustment of the machine for multiple article processing. With certain products, particularly smaller products, it may be desirable to wrap or otherwise process two or more articles in a package. Such a condition is shown in FIG. 8. The only difference between the mode of operation of FIG. 8 and that of FIGS. 4-6, previously described, is that the cam 41 has been adjusted to increase the dwell period during which the limit switch contacts LS1 are opened. This increase in dwell period of the cam can be adjusted by spreading the lobes 41a, 41b as indicated in FIG. 1A.

With the dwell of the cam 41 increased, the contacts of the limit switch LS can be held open long enough so that the relay HG remains de-energized for a sufficient period to maintain the metering conveyor MC on clutch for an extended period of time. This period of time will be adjusted so that two articles (for example), such as articles 40B1 and 40B2 will be transferred from the deadplate DP to the infeed conveyor IC while the limit switch LS is opened. As mentioned, when the limit switch LS is opened, the relay HG is de-energized and the clutch-brake remains on clutch, regardless of operation of the scanner SC. Even if the scanner SC senses a small gap between the groups of articles 40B1, B2 and 40C1, C2, as in the situation of FIG. 6, followed by the condition wherein the scanner SC senses the leading edge of the article 40C1, as in FIG. 4 and hence provides a pulse signal to the module CBM, the metering conveyor MC will remain on clutch as shown in FIG. 8.

Modified Form Multiple Article Processing

Instead of increasing the dwell of the cam 41 for multiple article processing, as described in connection with FIG. 8, the same conditions can be obtained by substituting for the clutch-brake module catalog item TR4-3 previously employed, an electronic latching version of Logic Module catalog item STR-10 manufactured by the same corporation. Such a module would provide an output to the relay HG for placing the metering conveyor MC on the brake only after receiving a predetermined number of pulses from the scanner SC, the number of pulses being set into the module. These pulses are provided each time a small gap is open between adjacent articles of a group, but they would energize the relay HG and place the metering conveyor MC on brake until the predetermined number of pulses had been received by the Logic Module. As mentioned, when the aforesaid predetermined number of pulses has been received (each pulse representing one of the articles of a group), the module energizes the relay HG and places the metering conveyor MC on brake, thereby forming the articles into groups, as is done in a mechanical manner in the modification of FIG. 8.

Modified Form—Trailing Edge Sensing

FIG. 9 shows a modified form of control circuit wherein the scanner operates by sensing the trailing edge of the leading article on the deadplate DP just as the leading article is picked up by the infeed conveyor IC instead of sensing the leading edge of the leading article of the row of articles before the leading article is pushed onto the infeed conveyor by the metering conveyor. This modification has one disadvantage in that there is no control over the position of the first article, such as article 40A in FIG. 9, because the control system does not operate precisely until the switch LS has been operated by the infeed conveyor IC. After the first article has left the deadplate, the remaining articles such as 40B, 40C, etc. will be under control of the switch and scanner system which will insure that subsequent articles are properly deposited on the infeed conveyor IC as previously described.

In order for the system to operate by sensing the trailing edge of the leading article, the scanner SC-1 (which can be the same unit as the previously described scanner SC) is set on its light increase mode. With this setting the scanner provides a pulse only after the beam has been first interrupted and is reflected from the tape T.

In FIG. 9 the leading article 40A has just been picked up by the infeed conveyor IC and has created a gap between it and the next article 40B on the deadplate CP. The scanner SC-1 has been positioned so that under these conditions light from the scanner lamp is reflected back to the scanner from the tape T, and since the scanner is set to operate in its light increase mode, this reflection will provide a pulse to the terminals 130,132. Since the pickup conveyor has not yet opened the limit switch LS, its contacts are closed the light increase pulse to the module CBM energizes the relay HG and places the metering conveyor MC on brake. Regardless of the first article 40A, subsequent articles in the row such as 40B, 40C etc. will be properly timed because the scanner will not be rearmed until the cam 41 has opened and reclosed the limit switch LS which action will restart the metering conveyor MC at a time which will place articles 40B, 40C, etc. onto the infeed conveyor IC in their proper position, as described in connection with operation of the scanner in its light decrease mode.

In FIGS. 10 to 13 the modification disclosed incorporates a constructional arrangement facilitating transfer of articles from the metering conveyor MC to the infeed conveyor IC. This objective is preferably accomplished by inclining a portion of the upper reach of the infeed conveyor so that each successive lug approaches the article feed path very gradually and the articles transferred thereto are more closely spaced since the upper leg of each dog or lug 26a can be erected before the dog passes the deadplate and the leg; is projected between the articles when it is oriented in a substantially vertical position. In addition to providing an incline portion to the upper run of the infeed conveyor IC the articles are supported and conveyed to the infeed conveyor by opposed conveyors lying substantially within a horizontal plane and which are sufficiently separated to allow passage of the dogs or lugs 26 therebetween.

Referring now to FIG. 10 it will be seen that the drive arrangement is modified in order to provide a drive to the horizontally opposed conveyors which will hereinafter be specifically identified. From the variable speed drive WVS a chain and sprocket 170 and 172, respectively, drive a transverse main shaft 174 having keyed thereon a sprocket 176 driving, by chain 178 and a sprocket 180, a shaft 182 providing an input to laterally spaced gear boxes 184 and 186. Projecting upwardly from each of the gear boxes are output shafts 188 and 190 having keyed thereon pulleys 192 and 194, respectively. Also keyed to the main shaft 174 is a variable pitch pulley 196 connected, by means of a belt 198, to another variable pitch pulley 200 driving a transverse shaft 202. Intermediate the ends of the shaft 202, an idler sprocket 204 viz., rotatably mounted on the shaft 202, is provided to define an inclined reach for a sprocket chain 206 carrying the dogs 26. Metering conveyor drive shaft 72 is coupled to the brake B mounted on one end of the shaft 72 and the clutch C mounted adjacent the other end. The shaft 72 is driven by the shaft 202 by virtue of a sprocket 207 keyed to the shaft 202 driving a chain 208 engaging a sprocket 210 keyed to the shaft 72. With reference to FIG. 13 it will be seen that idler sprocket 204 is retained in a fixed position by collars 205 fixed to the shaft 202 by set screws 209. Moreover shaft 202, as well as other operating elements are connected to side frames 209.

Extending between the discharge of the metering conveyor MC and the infeed conveyor IC is a transfer conveyor TC generally comprising laterally spaced cooperating conveyors circulating in a horizontal plane to allow respective inner reaches to be sufficiently transversely spaced to provide a slot through which the lugs or dogs 26 may pass. As it will be explained hereinafter this construction provides a mode of operation that permits closer spacing of the individual lugs 26 and yet insures proper location of each article with respect to the lugs.

The driven pulleys 192 and 194 drive belts 212 and 214 which are trained about rearwardly longitudinally spaced idler pulleys 216 and 218 keyed to shafts 220 and 222 (FIG. 12). Each of these latter mentioned shafts are rotatably supported in bearings 224 secured to downwardly extending brackets 226. The driven shaft 188 and 190 are also mounted in bearings 224a associated with brackets 226a. The common shaft 182 driving the gear boxes 184 and 186 has splined portions (not shown) which allow lateral adjustment of the gear boxes while maintaining the driving connection to the output shafts 188 and 190. Each of the brackets 226, 226A associated with the bearings for the driving and the idler pulleys, is formed with a guide 228 slideably received within a slot 230 formed in a housing of each bearing. The slot and guide arrangement allow lateral adjustment of the pulleys and yet maintains their horizontal orientation so that proper tracking of the belts 212 and 214 is maintained. In addition, and if required, the bearings may be adjusted so that the reaches of the belts 212 and 214 will converge as the inner reaches progress from the idler pulleys 216 and 218 to the drive pulleys 192 and 194.

With reference to FIG. 11 it will be observed that the infeed conveyor IC is modified to the extent that the orbit of the chain 206 includes an inclined portion 206a approaching its feed elevation wherein the leg 26a of the dog 26 is vertical when the chain reaches the upstream end of the rail 28. As the chain passes around the idler sprocket 30 it runs along a rail section 232 having each end slotted at 234 to clear the sprockets 30 and 204. A bracket 236, which is connected to spaced side the frame members 209 of the machine, supports the rail in the illustrated position. As each successive lug 26 comes into contact with the rail 232 the leg 26b establishes sliding contact with the rail 232 and thereby pivots the lug so that the leg 26a assumes an orientation which is normal to the path of the chain 206. It should be observed that as each lug 26 encounters the rail 232 the leg 26a is substantially below the feed line or plane in which articles 40 are advanced.

With reference to FIGS. 11 and 12 it will be seen that a finger 240, which is slightly offset and rigidly connected to a frame member 242, is positioned to receive light emmitted by the scanner SC and since each successive article passes over the finger the light beam from the scanner is masked or blocked in order to effect operation of the clutch or brakes depending upon whether the controls are set for the light increase or light decrease mode as explained above. As seen in FIG. 11, the finger 240 holds the articles above the upper, transporting surfaces of the transport conveyor TC and as seen in FIGS. 11 and 12, the rounded free end of finger 240 terminates at the centerline of transfer belt pulleys 216,218 and the finger body is almost as wide as the space between the belts 212, 214. Thus the finger 240 provides some frictional resistance to advance of the leading article on the metering conveyor MC, as does the dead plate DP in the form of FIGS. 1–9. For purposes of description it will be assumed that the controls respond to the light decrease mode of operation. Under these condition the article 40C overlying the finger 240 will release the brake and actuate the clutch when its leading edge has interrupted the light beam. This of course commences rotation of the shaft 72 feeding the leading article 40C and the row of abutting articles from right to left as viewed in FIG. 11. The drive ratio is such that the belts 212 and 214 operate at a lineal speed greater than the lineal speed of the chain 206. Under these conditions the article 40C, as it is fully supported by the inner reaches of the belt 212 and 213, is advanced toward the lug feeding the previous article. Once the article passes the transfer conveyor TC it is retarded by the support guide 238 allowing the leg 26a of the lugs to contact the rear surface or end of the article.

By providing the infeed conveyor IC with an orbit including the incline portion defined by the rail 232, each successive lug approaches each article on the transfer conveyor along a path which keeps to a minimum the distance between the successive articles. Accordingly the transfer conveyor TC by providing a live transfer between the metering conveyor MC and the infeed conveyor IC reduces the possibility of article disorientation and the gap necessary between the discharge of the metering conveyor and the inlet of the infeed conveyor.

Packaging certain products presents problems due to their sticky nature as the surfaces along which the products slide develop a build up of a tacky film or an irregular layer which has a tendency to retard feeding and thus effect disorientation or damage to the products. One manner in which this condition can be avoided is shown in the infeed conveyor modification illustrated in FIGS. 14, 15, and 16. The infeed conveyor IC is formed with the usual laterally spaced side frame mebers 250 to which are attached inwardly extending plates 252 defining a platform with a longitudinal opening 254 through which the dogs or lugs 26 may project above the platform. On the platform laterally adjustable brackets 256 are disposed and serve to guide the article being advanced by the lugs 26. Associated with each lug 26, and pivotally connected to adjacent links of the chain 206, are a series of plates 258 which define a pallet for supporting the article above the surface of the brackets 256. In order to insure the predetermined spacing between the successive articles it is of course necessary that each article comes into contact with the pushing leg 26a of each lug. Since the pallet defined by the plates 258 are located slightly vertically above the horizontal guide surfaces 256a of the brackets 256 the retarding effect serving to position the article in contact with the leg 26a of the lugs is not present. Therefore means, preferably arcuately shaped ramps 260 fixed to members 256a, are provided. As shown in FIG. 15 the crown or point of highest elevation is above the surface defined by the plates 258 forming the pallet. When the article, for example article 40A, encounters the ramps 260, the frictional force created thereby is directed in a direction opposite to the feed direction thereby retarding the article 40A until it is rearwardly engaged by the leg 26a of the feed lugs 26. In this way each article is properly positioned.

Although the best mode contemplated for carrying out the present invention has been herein shown and described it will be apparent that modification and variation may be made without departing from what is regarded to be the subject matter of the invention as defined in the appended claims.

We claim:

1. A feeder for an article processing machine of the type wherein said processing machine comprising article receiving means, means for cyclically processing articles received from said article receiving means and a continuous drive mechanism for said processing machine; said feeder comprising infeed conveyor means having longitudinally spaced article pushing dogs for feeding articles in spaced relation to said processing machine, means for driving said infeed conveyor means in synchronism with the drive mechanism of said processing machine, metering conveyor means for advancing leading articles of a row of normally abutting articles to said infeed conveyor means, and intermittent drive means for driving said metering conveyor means in synchronism with but at a slower speed than that of infeed conveyor drive means, said intermittent drive means comprising control means for starting and stopping said metering conveyor means, said control means comprising switch means cyclically operated in synchronism with the dogs on said infeed conveyor means to a cyclically occurring drive condition that provides a drive signal to said intermittent drive means for causing said metering conveyor means to advance leading articles of said row toward said infeed conveyor means, said control means also including scanner means for sensing an edge of a leading article advanced by said metering conveyor means for providing a stop signal to said intermittent drive means, said metering conveyor means; the improvement wherein the path of articles along said processing machine article receiving means is a longitudinal continuation of the path of travel of said infeed conveyor means, deadplate means between said metering and said infeed conveyor means for receiving articles pushed thereon by said metering conveyor means, said deadplate means supporting articles thereon until they are pushed off by the advance of upstream articles by said metering conveyor means, said intermittent drive means for said metering conveyor means including a variable speed ratio drive driven by said continuous processing machine drive mechanism and adjustable for driving said metering conveyor means at a speed which cause articles on said metering conveyor means to advance at a predetermined rate across said deadplate means at a selected speed relative to the spacing and speed of the dogs on said infeed conveyor means.

2. The feeder of claim 1, wherein said scanner is centrally disposed above said articles so that the timing of its signal is unaffected by the shape of the end contours of the articles in the vertical plane, said scanner comprising a light beam projector and a photo sensitive reflected light beam receiver; and a light beam reflector on said deadplate means.

3. A feeder for an article processing machine, said processing machine comprising a continuous drive mechanism for said processing machine; said feeder comprising infeed conveyor means having longitudinally spaced article pushing dogs for feeding articles in spaced relation to article receiving means for said processing machine, means for driving said infeed conveyor means that is synchronized with the drive mechanism of said processing machine, metering conveyor means for advancing articles to said infeed conveyor means, intermittent drive means for driving said metering conveyor means in synchronism with the drive mechanism of said processing machine but at a slower speed than that of said infeed conveyor drive means, means for transferring articles between said infeed conveyor and said metering conveyor means, said intermittent drive means comprising control means for starting and stopping said metering conveyor means, accumulating conveyor means for feeding articles to said metering conveyor means at a rate that forms a row of articles in end-to-end abutment on said metering conveyor means, said control means comprising metering conveyor controlling switch means cyclically operated in synchronism with the position of the dogs on said infeed conveyor means for providing metering conveyor start and stop signals and circuit means connected to said switch means for starting said metering conveyor means to advance leading articles of said row along said transfer means and onto said infeed conveyor means in response to a start signal from said switch means, said control means also including scanner means connected to said circuit means for sensing an edge of a downstream article from said row on said metering conveyor means for providing metering conveyor stop signals to said control means; the improvement wherein said article receiving means for said processing machine conducts articles along a path that forms a continuation of the direction of article advance by said infeed conveyor means, means for adjusting said control means so that cyclic operation of said switch means provides a start signal in response to the position of said dogs which causes said circuit means to override any scanner means stop signal as said metering conveyor means advances leading articles in the row across said transfer means, said metering conveyor means continuing to advance the leading article from the row of articles while it is being sensed by said scanner means and as the articles are picked up and accelerated, operation of said switch means to provide a stop signal causing said circuit means to re-arm said scanner means, re-arming of said scanner means not initially affecting the drive to said metering conveyor means while it continues to advance an article across said scanner means, said circuit means including means for causing a stop signal from said switch means to override a stop signal from said scanner means, means for adjusting said control means so that said switch means provides a start signal when said scanner means provides a stop signal only after the leading article at said transfer means had been in abutment with the upstream article on said metering conveyor means, said control means stopping the advance of articles by said metering conveyor means when said switch means is operated to provide a stop signal and when said scanner means senses an edge of an article at said transfer means when there had been a gap between said leading article and the upstream article.

4. The feeder of claim 3, wherein said intermittent drive means for the metering conveyor means comprises a clutch-brake assembly, said dog controlled switch means and said circuit means causing energization of the clutch and release of the brake, said scanner and circuit means causing release of the clutch and application of the brake after said scanner means has sensed a gap between articles and then senses the edge of an article in a row of articles on said metering conveyor means.

5. The feeder of claim 3, wherein said intermittent drive means for the metering conveyor means includes a variable speed ratio drive mechanism for adjusting the speed of the metering conveyor means in accordance with the spacing between the dogs on said infeed conveyor means.

6. The feeder of claim 3, wherein said switch means for starting said metering conveyor means and said circuit means comprising means for maintaining said scanner means armed until a predetermined number of articles has been picked up by said infeed conveyor means.

7. The feeder of claim 3, wherein said metering conveyor switch means is operated by cam means driven in synchronism with said metering conveyor means, said cam means being provided with adjustable means for prolonging the operation of said switch means for disarming said scanner means when the latter provides a stop signal.

8. A feeder for an article processing machine of the type wherein said processing machine comprising article receiving means, means for cyclically processing articles receiving from said article receiving means and a continuous drive mechanism for said processing machine; said feeder comprising infeed conveyor means having longitudinally spaced article pushing dogs for feeding articles in spaced relation to said processing machine, means for driving said infeed conveyor means in synchronism with the drive mechanism of said processing machine, metering conveyor means for advancing leading articles of a row of normally abutting articles to said infeed conveyor means, article transfer means between said metering and infeed conveyor means, and intermittent drive means for driving said metering conveyor means in synchronism with the drive mechanism of said processing machine but at a slower speed than that of infeed conveyor drive means, said intermittent drive means comprising control means for starting and stopping said metering conveyor means including switch means cyclically operated in synchronism with the dogs on said infeed conveyor to cyclically provide drive and stop signals to said intermittent drive means, said drive signals causing said metering conveyor means to advance leading articles thereon toward said infeed conveyor means, said control means also including scanner means for sensing an edge of a leading article advanced by said metering conveyor means for providing a stop signal to said intermittent drive means for said metering conveyor means; the improvement wherein articles moving along said processing machine article receiving means has a path that is a longitudinal continuation of the path of travel of said infeed conveyor means so that said article receiving means can receive articles continuously, a variable speed ratio drive driven by said continuous processing machine drive mechanism for driving said metering conveyor means at a speed which causes articles on said metering conveyor means to advance at a selected rate across said transfer means relative to the spacing and speed of the dogs on said infeed conveyor means, said control means including means for causing a metering conveyor drive signal from said switch means to override a metering conveyor stop signal from said scanner means when said switch means is in its drive signal condition, and means for adjusting said control means so that under ideal conditions wherein the articles on said metering conveyor are of equal length and are in end-to-end abutment, a drive signal from said switch means keeps said metering conveyor in operation even upon generation of a stop signal for the metering conveyor means by said scanner means.

9. A feeder for an article processing machine of the type wherein said processing machine comprising article receiving means, means for cyclically processing articles received from said article receiving means and a continuous drive mechanism for said processing machine; said feeder comprising infeed conveyor means including an endless chain having longitudinally spaced, article pushing dogs for feeding articles in spaced relation to said processing machine, means for driving said infeed conveyor chain in synchronism with the drive mechanism of said processing machine, metering conveyor means for advancing leading articles of a row of normally abutting articles to said infeed conveyor means, there being a gap between said metering and infeed conveyor means, article transfer means for advancing articles across said gap, and intermittent drive means for driving said metering conveyor means in synchronism with the drive mechanism of said processing machine but at a slower speed than that of infeed conveyor drive means, said intermittent drive means comprising control means for starting and stopping said metering conveyor means, said infeed conveyor dogs including article pushing legs that are pivotally mounted on the chain, and cam means for erecting the dog legs to their pushing positions; the improvement wherein said article transfer means comprises laterally opposed endless transfer conveyors for bridging said gap between the metering and infeed conveyor means, each transfer conveyor comprising an article transporting reach and a return reach, said infeed conveyor chain having an upwardly inclined section beneath said transfer conveyors for bringing dogs from beneath said transfer conveyors up into an article feeding position, said dog erecting cam means including means for erecting the dogs along said inclined section so that their legs are advanced between the article transporting reaches of said transfer conveyors in an article pushing position and behind articles being transported across said gap, and pulley means for changing the direction of said infeed conveyor chain to provide an infeed conveyor section that runs generally horizontal, said cam means maintaining the dogs on said infeed conveyor chain erected along said generally horizontal section, and means for driving said transfer conveyors at a speed higher than that of said infeed conveyor chain.

10. The feeder of claim 9, wherein both reaches of each transfer conveyor lie in a common horizontal plane.

11. The feeder of claim 9, wherein said feeder conveyor means also including stationary elongate article guide platform means for slidably supporting the bases of articles advanced by the dogs of said infeed conveyor chain, said platform means having laterally spaced sections to provide a slot for receiving the pushing legs of the dogs on said infeed conveyor chain, said infeed conveyor platform means having an article receiving end that is spaced a substantial distance from the article delivery end of said metering conveyor means thereby providing said gap between said metering conveyor means and said platform means.

12. The feeder of claim 9, wherein said transfer means comprises a deadplate projecting past the discharge end of said metering conveyor means, said deadplate having an article supporting surface that is disposed slightly above the article receiving ends of the article transporting reaches of said transfer conveyors, the article delivery end of said deadplate being disposed a substantial distance downstream of said infeed conveyor chain pulley means for accommodating ascent of the erected dog legs along said upwardly inclined infeed conveyor chain section without interference with the deadplate.

13. A feeding apparatus for feeding articles from an abutting row of articles on an intermittently driven metering conveyor to a faster moving infeed conveyor provided with a series of equally spaced feeding dogs that feed the articles to an article processing machine; the improvement in said feeding apparatus comprising transfer conveyor means for receiving leading articles advanced by the intermittently operable metering conveyor and transporting them along an article transporting path to each dog of said infeed conveyor to produce a separation between the articles equal to the spacing of the dogs, said transfer conveyor means comprising opposed conveyors located in a common horizontal plane so that respective reaches move from the intermittently operable metering conveyor to the infeed conveyor to support and transfer each article for engagement by the dogs, said infeed conveyor having a portion of its feeding reach located below and inclined upwardly toward the article transporting path to advance each dog to pass between said respective reaches of said article transfer conveyor means and thereby locate each successive dog rearwardly of each article, means for driving said transfer conveyor means at a speed faster than the speed of said infeed conveyor so that each article advanced thereby is forward of the dog being projected between said respective reaches of said transfer conveyor means, means secured to said infeed conveyor and located in advance of each dog for supporing the article, and means for positioning each article against the adjacent rearward dog before the article is fed into said processing machine.

14. The feeding apparatus according to claim 13, wherein the supporting means comprises at least one plate connected to said infeed conveyor ahead of each lug, said plate being of a dimension transverse to the direction of movement which is less than width of the articles so that opposed lateral ends of the articles extend beyond the lateral ends of said plate, said article positioning means engaging those portions of the lower surface of the articles extending beyond the lateral ends of the plate for retarding the articles as the infeed conveyor advances until the adjacent rearward lug is brought into engagement with the articles.

* * * * *